United States Patent
Gao et al.

(10) Patent No.: US 10,237,387 B2
(45) Date of Patent: Mar. 19, 2019

(54) INCOMING CALL RECORDING METHOD AND DEVICE FOR MULTI-CHANNEL TERMINAL

(71) Applicant: SPREADTRUM COMMUNICATIONS (SHANGHAI) CO., LTD., Shanghai (CN)

(72) Inventors: Xichun Gao, Shanghai (CN); Xianliang Chen, Shanghai (CN); Yi He, Shanghai (CN); Jinjin Ni, Shanghai (CN); Yiguo Zhao, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 15/810,136

(22) Filed: Nov. 13, 2017

(65) Prior Publication Data

US 2018/0139316 A1    May 17, 2018

(30) Foreign Application Priority Data

Nov. 14, 2016   (CN) .......................... 2016 1 1003695

(51) Int. Cl.
*H04M 1/656* (2006.01)
*H04M 1/57* (2006.01)
(Continued)

(52) U.S. Cl.
CPC ........... *H04M 1/656* (2013.01); *H04M 1/573* (2013.01); *H04M 1/658* (2013.01); *H04M 3/533* (2013.01)

(58) Field of Classification Search
CPC ......... H04M 1/72558; H04M 3/42221; H04M 2203/301; H04M 3/5175;
(Continued)

(56) References Cited

U.S. PATENT DOCUMENTS 6,483,855 B1 * 11/2002 Minagawa ........ H04M 3/42221
370/493
7,970,739 B2 * 6/2011 Carmel ................... H04L 69/14
707/634

(Continued)

FOREIGN PATENT DOCUMENTS

WO    WO 2004057849 A1 *  7/2004  .......... H04M 3/2281
WO    WO-2004057849 A1 *  7/2004  .......... H04M 3/2281

*Primary Examiner* — Akelaw Teshale
(74) *Attorney, Agent, or Firm* — Kilpatrick Townsend & Stockton, LLP (57) ABSTRACT

Incoming call recording method and device for a multi-channel terminal are provided. The method includes: receiving a service request associated with a current subscriber identity card, and the service request comprises a called service request to a current subscriber which is identified by the current subscriber identity card; and in response to the service request, setting up a first service channel for making a call and starting recording based on an instruction of the current subscriber, and the first service channel is set up based on the current subscriber identity card. Service data transmitted by a remote terminal of the service request may be recorded based on the first service channel, so that a subscriber can know a missed incoming call when the subscriber is inconvenient to listen to the incoming call, which may greatly improve user experience.

18 Claims, 2 Drawing Sheets

(51) Int. Cl.
*H04M 1/658* (2006.01)
*H04M 3/533* (2006.01)

(58) Field of Classification Search
CPC ..... H04M 2203/401; H04M 2203/551; H04M 2203/6009; H04M 3/2281; H04M 3/36; H04M 15/8016; H04M 2215/7407; H04M 3/2218; H04M 3/51; H04M 2201/40; H04M 2201/60; H04M 3/04
USPC ............... 379/88.22, 112.01, 32.01, 88.02, 8
See application file for complete search history.

(56) References Cited

U.S. PATENT DOCUMENTS

| | | | | |
|---|---|---|---|---|
| 8,135,115 | B1* | 3/2012 | Hogg, Jr. ............. | H04M 1/64 370/260 |
| 2005/0163093 | A1* | 7/2005 | Garg .................... | H04W 76/15 370/342 |
| 2012/0297451 | A1* | 11/2012 | Ozzie ................... | H04L 63/08 726/3 |
| 2013/0005394 | A1* | 1/2013 | Geary .................. | H04W 52/028 455/552.1 |
| 2013/0029720 | A1* | 1/2013 | Clevorn ............... | H04L 1/0036 455/552.1 |
| 2013/0045720 | A1* | 2/2013 | Madhavapeddl ...... | H04W 4/12 455/414.1 |
| 2013/0109436 | A1* | 5/2013 | Tat ....................... | H04W 8/183 455/558 |
| 2014/0344913 | A1* | 11/2014 | Stahl ................... | H04L 12/1403 726/11 |
| 2015/0163827 | A1* | 6/2015 | Ekici ................... | H04W 68/02 370/338 |
| 2015/0171909 | A1* | 6/2015 | Gao ..................... | H04B 1/3816 455/558 |

\* cited by examiner

INCOMING CALL RECORDING METHOD AND DEVICE FOR MULTI-CHANNEL TERMINAL

CROSS-REFERENCE TO RELATED APPLICATIONS

The present application claims priority to Chinese patent application No. 201611003695.4, filed on Nov. 14, 2016, and entitled "INCOMING CALL RECORDING METHOD AND DEVICE FOR MULTI-CHANNEL TERMINAL", and the entire disclosure of which is incorporated herein by reference.

TECHNICAL FIELD

The present disclosure generally relates to communication technology field, and more particularly, to incoming call recording method and device for a multi-channel terminal.

BACKGROUND

With the continuous improvement of mobile network bandwidth and continuous optimization of upload and download rates, currently, calls of mobile terminals mainly include a variety of traditional related service based on data, such as voice call or video call.

Existing voice mail service is generally provided based on a network. For example, for a terminal which has opened the voicemail service, if a subscriber is currently inconvenient to answer a call, the subscriber can record the missed call in the voice mail provided by the network. For another example, if the subscriber has already been in a calling state and there is a new incoming call, and the subscriber does not want to answer the new incoming call, the subscriber can send a hang up command to the terminal. In response to the subscriber's hang up instruction, the terminal prompts to a remote terminal of the incoming call that a called subscriber is busy now. And the network forwards the incoming call to a voicemail underneath, so that the remote terminal can record.

However, such solutions result in a subscriber having to be connected to the network to download from the voicemail corresponding content when the subscriber wants to listen to the content of a missed call. If the subscriber is in a network blind area when downloading, the terminal cannot connect to the network, the subscriber will not be able to timely access to voice mail to acquire the recorded information, which is not conducive to the called subscriber to timely know the missed call, and further affects user's call experience.

SUMMARY

In embodiments of the present disclosure, content of a missed incoming call may be recorded by a called subscriber based on a terminal, which may improve operation experience of common calls of users.

In an embodiment of the present disclosure, an incoming call recording method for a multi-channel terminal is provided, including: receiving a service request associated with a current subscriber identity card, and the service request includes a called service request to a current subscriber which is identified by the current subscriber identity card; and in response to the service request, setting up a first service channel for making a call and starting recording based on an instruction of the current subscriber, and the first service channel is set up based on the current subscriber identity card.

In one embodiment, prior to receiving a service request associated with a current subscriber identity card, the current subscriber identity card may be in a call using a second service channel which is set up based on the current subscriber identity card.

In one embodiment, when the first service channel is set up for making a call, the second service channel may retain an activated state.

In one embodiment, the first and second service channels may be set up based on a same service access way.

In one embodiment, content of the recording may be service data in the first service channel.

In one embodiment, the method may further include: when receiving an instruction of terminating the recording, terminating the recording and releasing the first service channel.

In one embodiment, the instruction of terminating the recording may be given by the current subscriber, or received from a sender which sends the service request via the first service channel.

In one embodiment, the instruction of the current subscriber may include: a real-time instruction obtained by interaction with the current subscriber after receiving the service request, or an instruction predetermined by the current subscriber before receiving the service request.

In one embodiment, following setting up the first service channel for making the call and prior to starting the recording, the method may further include: playing a predetermined voice based on the first service channel.

In one embodiment, when starting the recording, or during the recording, or when terminating the recording, an indication may be given to the current subscriber.

In one embodiment, service requested by the service request may include voice service or video service.

In one embodiment, the service request may include a service request based on an IP Multimedia Subsystem (IMS) network, and service requested by the service request may include service based on the IMS network.

In one embodiment, the service requested by the service request may include VoLTE service or VoWiFi service.

In one embodiment, the first and second service channels may perform service data transmission based on a data channel which is set up based on a radio network.

In one embodiment, the data channel may be a data channel based on an IMS network.

In one embodiment, the data channel based on the IMS network may include a data channel corresponding to IMS Public Data Network (PDN).

In one embodiment, the first and second service channels may correspond to different ports of the data channel.

In an embodiment of the present disclosure, an incoming call recording device for a multi-channel terminal is provided, including: a receiving circuitry configured to receive a service request associated with a current subscriber identity card, and the service request includes a called service request to a current subscriber which is identified by the current subscriber identity card; and a recording circuitry configured to: in response to the service request, set up a first service channel for making a call and start recording based on an instruction of the current subscriber, and the first service channel is set up based on the current subscriber identity card.

In one embodiment, the device may further include an implementing circuitry configured for the current subscriber identity card to make a call using a second service channel which is set up based on the current subscriber identity card, before the service request associated with the current subscriber identity card is received.

In one embodiment, when the recording circuitry sets up the first service channel for making a call, the second service channel retains an activated state.

In one embodiment, the first and second service channels may be set up based on a same service access way.

In one embodiment, content of the recording may be service data in the first service channel.

In one embodiment, the device may further include a terminating circuitry configured to: when receiving an instruction of terminating the recording, terminate the recording and release the first service channel.

In one embodiment, the instruction of terminating the recording may be given by the current subscriber, or received from a sender which sends the service request via the first service channel.

In one embodiment, the instruction of the current subscriber may include: a real-time instruction obtained by interaction with the current subscriber after receiving the service request, or an instruction predetermined by the current subscriber before receiving the service request.

In one embodiment, the recording circuitry may include a voice playing sub-circuitry configured to: following setting up the first service channel for making the call and prior to starting the recording, play a predetermined voice based on the first service channel.

In one embodiment, the device may further include an indicating circuitry configured to: when starting the recording, or during the recording, or when terminating the recording, give an indication to the current subscriber.

In one embodiment, service requested by the service request may include voice service or video service.

In one embodiment, the service request may include a service request based on an IMS network, and service requested by the service request may include service based on the IMS network.

In one embodiment, the service requested by the service request may include VoLTE service or VoWiFi service.

In one embodiment, the first and second service channels perform service data transmission based on a data channel which is set up based on a radio network.

In one embodiment, the data channel may be a data channel based on an IMS network.

In one embodiment, the data channel based on the IMS network may include a data channel corresponding to IMS PDN.

In one embodiment, the first and second service channels may correspond to different ports of the data channel.

Embodiments of the present disclosure may provide following advantages. A service request associated with a current subscriber identity card is received, and in response to the service request, a first service channel is set up for making a call and recording is started based on an instruction of the current subscriber, and the first service channel is set up based on the current subscriber identity card, and the service request includes a called service request to a current subscriber which is identified by the current subscriber identity card. Compared with the existing techniques where missed incoming calls are recorded based on voice mail service of a network, in embodiments of the present disclosure, even if a subscriber doesn't want to listen to an incoming call currently, a terminal may directly set up a service channel for making a call and start recording, to store content of the incoming call with a record in the terminal, so that the subscriber may easily fetch the content of the missed incoming call later.

Further, prior to receiving a service request associated with a current subscriber identity card, the current subscriber identity card may be in a call using a second service channel which is set up based on the current subscriber identity card. Compared with the existing techniques where the terminal can only keep one service channel in an activated state at a time point, in embodiments of the present disclosure, one subscriber identity card can set up at least two service channels in the activated state, so that the subscriber in a calling state can still follow up a subsequent incoming call and record content of the subsequent incoming call through other service channels, which may greatly improve user experience.

Further, when an instruction of terminating the recording is received from the current subscriber, or from a sender which transmits the service request via the first service channel, the recording is terminated and the first service channel is released, so that the terminal may control the recording more flexibly according to the instruction from any one terminal of the first service channel, and timely respond to the instruction of the current subscriber or the sender transmitting the service request.

DETAILED DESCRIPTION

As described in the background, content of missed incoming calls are recorded only based on voice mail provided by a network, which is not conducive to the called subscriber to timely know the missed incoming calls, and further affects user's call experience.

In embodiments of the present disclosure, a service request associated with a current subscriber identity card is received, and in response to the service request, a first service channel is set up for making a call and recording is started based on an instruction of the current subscriber, and the first service channel is set up based on the current subscriber identity card, and the service request includes a called service request to a current subscriber which is identified by the current subscriber identity card. Even if a subscriber doesn't want to listen to an incoming call currently, a terminal may directly set up a service channel for making a call and start recording, to store content of the incoming call with a record in the terminal, so that the subscriber may easily fetch the content of the missed incoming call later.

In order to clarify the object, solutions and advantages of embodiments of the present disclosure, embodiments of present disclosure will be described clearly in detail in conjunction with accompanying drawings.

Figure 1:
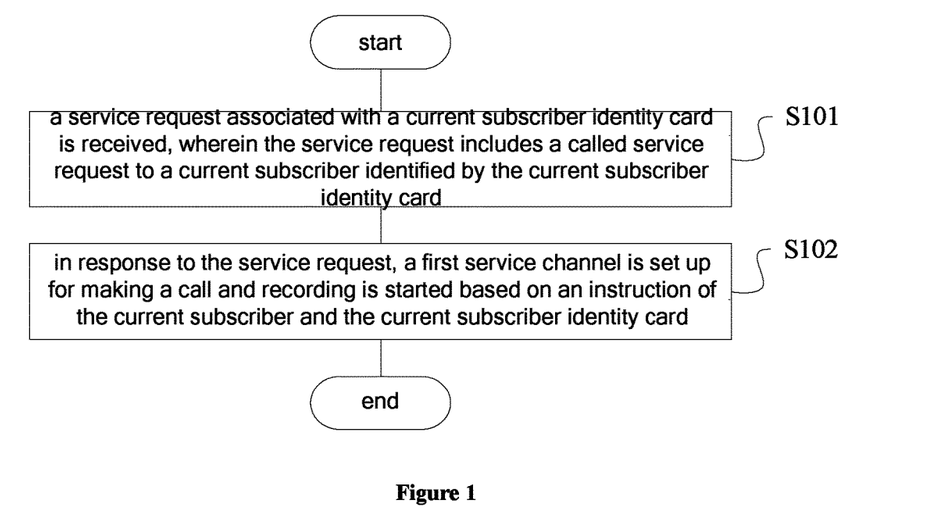
FIG. 1 schematically illustrates a flow chart of an incoming call recording method for a multi-channel terminal according to an embodiment.

FIG. 1 schematically illustrates a flow chart of an incoming call recording method for a multi-channel terminal according to an embodiment. The terminal may be a mobile terminal, or other terminal devices capable of processing multi-channel service. The multi-channel may be at least two service channels which perform service data transmission based on a data channel which is set up based on a radio network.

The radio network may include 5G, 4G, 3G, 2G or WiFi network. The data channel may be a channel used for transmitting data under various service types, such as a data channel based on an IMS network. For example, for VoLTE or VoWiFi service, the data channel may be a data channel corresponding to IMS PDN.

In some embodiments, S101 may be performed first. In S101, a service request associated with a current subscriber identity card is received, and the service request includes a called service request to a current subscriber which is identified by the current subscriber identity card. In some embodiments, being associated with the current subscriber identity card may include being associated with the subscriber identified by the current subscriber identity card.

Afterward, in S102, in response to the service request, a first service channel is set up for making a call and recording is started based on an instruction of the current subscriber, and the first service channel is set up based on the current subscriber identity card. In some embodiments, content of the recording may be service data in the first service channel. In some embodiments, the first service channel is set up based on the current subscriber identity card by the current subscriber. In some embodiments, the service data may include call content of a sender of the service request. In some embodiments, in response to the service request, the sender of the service request (for example, other terminal other than the terminal where the current subscriber is located) sets up a call with the current subscriber via the first service channel. However, during the call, the current subscriber does not listen or respond in voice but only recording. The way of recording may be any suitable way in the existing techniques. For example, a recording circuitry configured in the terminal is connected with the first service channel to perform the recording.

In some embodiments, before S101, the current subscriber identity card may be in a call using a second service channel which is set up based on the current subscriber identity card. In some embodiments, the second service channel may be set up by the current subscriber based on the current subscriber identity card. Those skilled in the art can understand that, based on embodiments of the present disclosure, no matter whether the current subscriber identity card is using the second service channel to be in a call, when a new service request comes, the terminal can set up the first service channel to respond to the service request, so as to record call content of the sender of the new service request. In some embodiments, the current subscriber to identity card has set up the second service channel with a network via the data channel which is set up based on the radio network.

In some embodiments, when the second service channel is set up or released based on the current subscriber identity card, the service request associated with the current subscriber identity card may be received.

In some embodiments, the first and second service channels may include channels for transmitting service data, such as voice or video. In some embodiments, the call may include a voice call or a video call. More embodiments may be obtained by those skilled in the art according to practical requirements, and are not described in detail here.

In some embodiments, when the first service channel is set up for making a call, the second service channel may retain an activated state. Those skilled in the art can understand that, the activated state denotes to a state where service data can be transmitted in a service channel.

In some embodiments, the first and second service channels may be set up based on a same service access way. The service access way may be realized through circuit switch, packet switch, IMS or an IP network.

In some embodiments, service requested by the service request may include voice service or video service.

In some embodiments, the service request may include a service request based on an IMS network, and service requested by the service request may include service based on the IMS network. In some embodiments, service corresponding to the second service channel may include service based on an IMS network.

In some embodiments, the service requested by the service request may include VoLTE service or VoWiFi service.

In some embodiments, the first and second service channels may perform service data transmission based on a data channel which is set up based on a radio network.

In some embodiments, the data channel may be a data channel based on an IMS network. For example, the data channel based on the IMS network may include a data channel corresponding to IMS PDN.

In some embodiments, the first and second service channels may correspond to different ports of the data channel. Those skilled in the art can understand that, different from the existing techniques, in embodiments of the present disclosure, multiple service channels may be set up based on the same data channel, and may be identified by different ports. For example, in VoLTE service, the different ports may be set up in a data channel corresponding to the same IMS PDN, to obtain the multiple service channels.

In some embodiments, the instruction of the current subscriber may include: a real-time instruction obtained by interaction with the current subscriber after receiving the service request. For example, the current subscriber is using the second service channel to make a call currently. After receiving the service request, the terminal send indication information to the current subscriber, and determine whether to respond to the service request based on feedback of the current subscriber. If the feedback of the current subscriber is to respond to the service request and to recording, the terminal sets up the first service channel to set up another call, and records call content of the sender of the service request.

In some embodiments, the instruction of the current subscriber may include: an instruction predetermined by the current subscriber before receiving the service request. For example, for a situation that the current subscriber receives a second call when making a first call, the current subscriber may preset the instruction in the terminal. If the current subscriber preset the instruction as recording the second call, the terminal may not request the current subscriber after receiving the service request of the second call, and processing the service request according to the preset instruction. From above, compared with the existing techniques where missed incoming calls are recorded based on voice mail service of a network, in embodiments of the present disclosure, even if a subscriber doesn't want to listen to an incoming call currently, a terminal may directly set up a service channel for making a call and start recording, to store content of the incoming call with a record in the terminal, so that the subscriber may easily fetch the content of the missed incoming call later.

Further, prior to receiving a service request associated with a current subscriber identity card, the current subscriber identity card may be in a call using a second service channel which is set up based on the current subscriber identity card. Compared with the existing techniques where the terminal can only keep one service channel in an activated state at a time point, in embodiments of the present disclosure, one subscriber identity card can set up at least two service channels in the activated state, so as to meet the requirements that the subscriber in a calling state can still record content of the second incoming call, which optimizes processing logic to multiple service channels, enables the second service channel to retain the activated state when setting up the first service channel to make the call, and greatly improves user experience.

Figure 2:
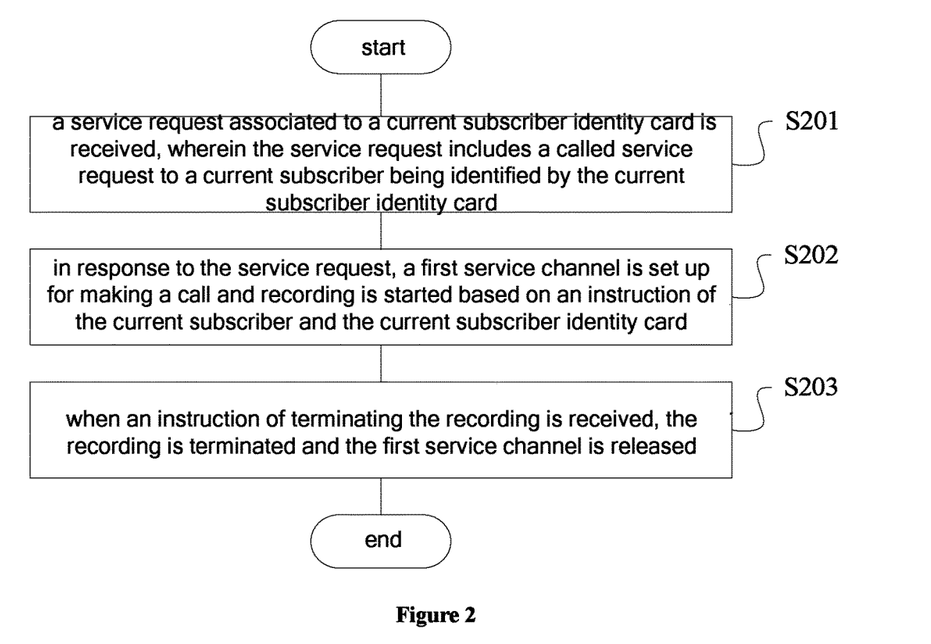
FIG. 2 schematically illustrates a flow chart of an incoming call recording method for a multi-channel terminal according to an embodiment.

FIG. 2 schematically illustrates a flow chart of an incoming call recording method for a multi-channel terminal according to an embodiment. In some embodiments, S201 may be performed first. In S201, a service request associated with a current subscriber identity card is received, and the service request includes a called service request to a current subscriber which is identified by the current subscriber identity card. More details may be referred to S101 in the above embodiment as shown in FIG. 1, and are not described in detail here.

Afterward, in S202, in response to the service request, a first service channel is set up for making a call and recording is started based on an instruction of the current subscriber, and the first service channel is set up based on the current subscriber identity card. More details may be referred to S102 in the above embodiment as shown in FIG. 1, and are not described in detail here.

In S203, when an instruction of terminating the recording is received, the recording is terminated and the first service channel is released. In some embodiments, the instruction of terminating the recording may be given by the current subscriber. For example, the current subscriber doesn't want to record call content of the sender of the service request, and send to the terminal the instruction of terminating the recording.

In some embodiments, when terminating using the second service channel to perform the call, the current subscriber may send the instruction of terminating the recording, to instruct the terminal to terminate the recording and use the first service channel to make a call with the sender of the service request.

In some embodiments, the instruction of terminating the recording may be received from the sender of the service request via the first service channel. For example, the sender of the service request expects to hang up the call when content of the call with the current subscriber is talked over. The hang-up action generates the instruction of terminating the recording which is sent from the sender of the service request to the terminal via the first service channel. For another example, the sender of the service request does not want recording, and thus may directly hang up the call after the first service channel is set up. The hang-up action also generates the instruction of terminating the recording which is sent from the sender of the service request to the terminal via the first service channel. More embodiments may be obtained by those skilled in the art according to practical requirements.

From above, a trigger time of terminating the recording is optimized, so that the terminal may respond to the instruction of the current subscriber or the sender of the service request more rapidly and reasonably. The terminal may terminate the recording and stop responding to the service request according to the instruction, which may avoid excessive waste of the terminal's memory and power resources, and improve user experience.

In some embodiments, following setting up the first service channel for making the call and prior to starting the recording, the method may further include: playing a predetermined voice based on the first service channel. For example, the current subscriber may record voice "I'm inconvenient to listen to the all. Please leave a message after the beep" in the terminal in advance. Thus, following setting up the first service channel to respond to the service request, the predetermined voice is played to the sender of the service request based on the first service channel, so that the sender of the service request can perform subsequent actions according to indication in the voice of the current subscriber. In this way, better operation experience may be provided for two subscribers of the call.

In some embodiments, when starting the recording, or during the recording, and/or when terminating the recording, an indication may be given to the current subscriber. For example, when starting the recording and/or when terminating the recording, status information of starting and/or terminating the recording may be exhibited on the terminal. For another example, during the recording, it is indicated on the terminal that the current subscriber is in a recording state in the form of a red dot flashing.

Figure 3:
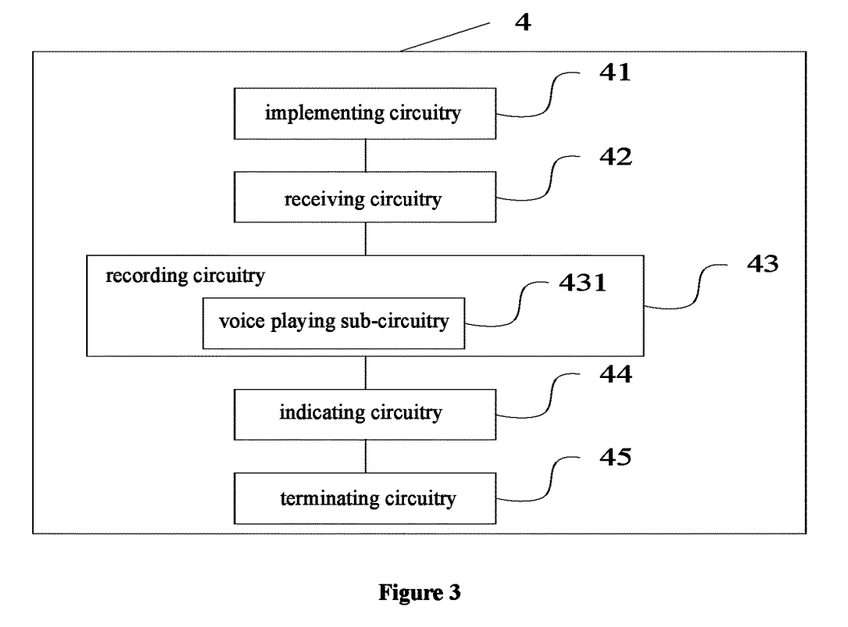
FIG. 3 schematically illustrates a structural diagram of an incoming call recording device for a multi-channel terminal according to an embodiment.

FIG. 3 schematically illustrates a structural diagram of an incoming call recording device for a multi-channel terminal according to an embodiment. Those skilled in the art can understand that, the incoming call recording device 4 for the multi-channel terminal is used for implementing methods provided in the above embodiments as shown in FIGS. 1 and 2. In some embodiments, the incoming call recording device 4 for the multi-channel terminal includes: a receiving circuitry 42 configured to receive a service request associated with a current subscriber identity card, and the service request includes a called service request to a current subscriber which is identified by the current subscriber identity card; and a recording circuitry 43 configured to: in response to the service request, set up a first service channel for making a call and start recording based on an instruction of the current subscriber, and the first service channel is set up based on the current subscriber identity card.

In some embodiments, the device 4 may further include an implementing circuitry 41 configured for the current subscriber identity card to make a call using a second service channel which is set up based on the current subscriber identity card, before the service request associated with the current subscriber identity card is received.

In some embodiments, when the recording circuitry 43 sets up the first service channel for making a call, the second service channel retains an activated state.

In some embodiments, the first and second service channels may be set up based on a same service access way.

In some embodiments, content of the recording may be service data in the first service channel.

In some embodiments, the device 4 may further include a terminating circuitry 45 configured to: when receiving an instruction of terminating the recording, terminate the recording and release the first service channel.

In some embodiments, the instruction of terminating the recording may be given by the current subscriber, or received from a sender which sends the service request via the first service channel.

In some embodiments, the instruction of the current subscriber may include: a real-time instruction obtained by interaction with the current subscriber after receiving the service request, or an instruction predetermined by the current subscriber before receiving the service request.

In some embodiments, the recording circuitry 43 may include a voice playing sub-circuitry 431 configured to: following setting up the first service channel for making the call and prior to starting the recording, play a predetermined voice based on the first service channel.

In some embodiments, the device 4 may further include an indicating circuitry 44 configured to: when starting the recording, or during the recording, or when terminating the recording, give an indication to the current subscriber.

In some embodiments, service requested by the service request may include voice service or video service.

In some embodiments, the service request may include a service request based on an IMS network, and service requested by the service request may include service based on the IMS network.

In some embodiments, the service requested by the service request may include VoLTE service or VoWiFi service.

In some embodiments, the first and second service channels perform service data transmission based on a data channel which is set up based on a radio network.

In some embodiments, the data channel may be a data channel based on an IMS network.

In some embodiments, the data channel based on the IMS network may include a data channel corresponding to IMS PDN.

In some embodiments, the first and second service channels may correspond to different ports of the data channel.

In some embodiments, when the second service channel is set up or released based on the current subscriber identity card, the device 4 may receive the service request associated with the current subscriber identity card.

More details about working principles and working modes of the device 4 may be referred to the above descriptions of FIGS. 1 and 2, and are not described in detail here.

Figure 4:
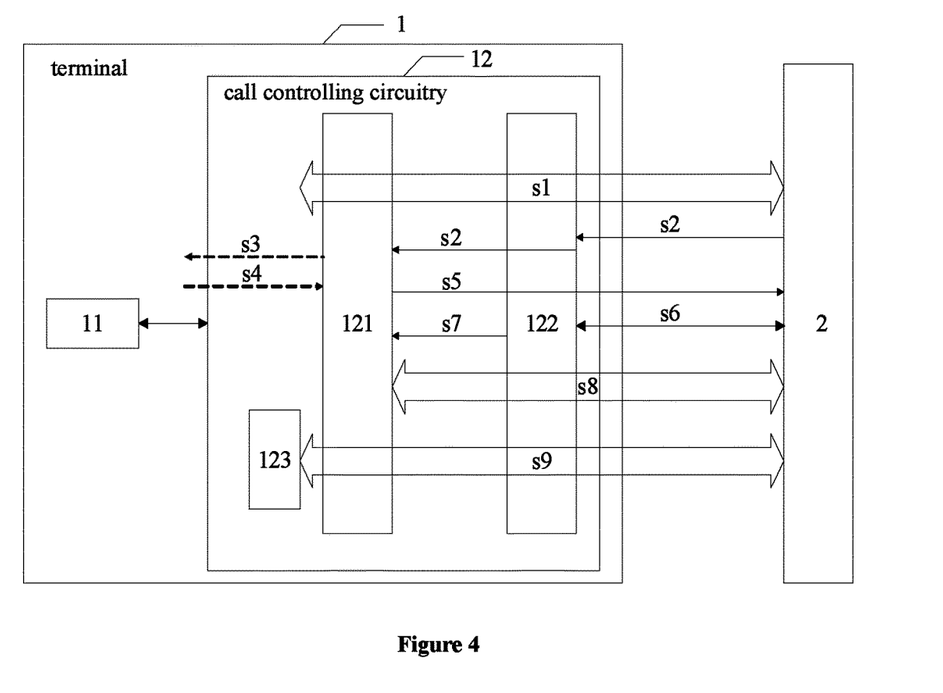
FIG. 4 schematically illustrates an application scene diagram of an incoming call recording method for a multi-channel terminal according to an embodiment.

FIG. 4 schematically illustrates an application scene diagram of an incoming call recording method for a multi-channel terminal according to an embodiment. The terminal 1 may be a mobile terminal configured with a subscriber identity card 11 that is used for identifying a subscriber (not shown in FIG. 4). The service request includes a called service request to the subscriber.

In the application scene, the service request is sent to the terminal 1 based on a network 2. The network 2 may include a radio network for setting up a radio connection, or include a service network for providing service to the terminal 1. The radio network may include a radio network which can be realized by a public communication network, such as 5G, 4G, 3G or GPRS network, or a wireless local area network, such as WiFi. Those skilled in the art can understand that, networks which take radio electromagnetic wave as a transmitting medium may serve as the radio network in embodiments of the present disclosure, and are not described in detail here.

In some embodiments, voice service, video service and short message service based on 4G Long Term Evolution (LTE) network may be taken as VoLTE service, and voice service, video service and short message service based on WiFi network may be taken as VoWiFi service.

In some embodiments, the service network may correspond to the service request. For example, when the service request is a VoLTE service request or a VoWiFi service request, the service network may be an IMS network.

In some embodiments, the terminal 1 may set up a PDN for transmitting data with the IMS network, i.e., a data channel with the IMS network. In some embodiments, the data channel may be a channel corresponding to IMS PDN. The channel corresponding to the same IMS PDN may set up at least two service channels which respectively correspond to different ports of the channel corresponding to the IMS PDN.

In some embodiments, the subscriber identity card 11 in the terminal 1 sets up two service channels (not shown in FIG. 4), one (the first service channel) using a data channel to transmit service data via a first port (not shown in FIG. 4), while the other (the second service channel) using the same data channel to transmit service data via a second port (not shown in FIG. 4). The two service channels may transmit service data using the data channel at a same time. In some embodiments, the data channel may be set up by a service channel set-up controlling circuitry 121 and a radio source set-up controlling circuitry 122 in a call controlling circuitry 12 based on a radio connection with the network 2. For example, in VoLTE service, the data channel may be a channel corresponding to IMS PDN.

When the subscriber identity card 11 is using the second service channel to make a first call s1, the terminal 1 receives a called service request s2 to a subscriber (not shown in FIG. 4) identified by the subscriber identity card 11. The call controlling circuitry 12 may perform s3 of indicating the called service request s2 to the subscriber identity card 11. If an instruction s4 fed back by the subscriber identity card 11 includes a recording instruction, the call controlling circuitry 12 sets up the first service channel to respond to the called service request s2 and starts recording s9, so as to get through a second call s8 timely and further obtain a recording result which is stored in a storing circuitry 123. As the second call s8 and the first call s1 are made in different service channels, they are not conflicting. The second service channel corresponding to the first call s1 can still retain an activated state, which may effectively improve operation experience of two subscribers of the call.

In VoLTE service, the service channel set-up controlling circuitry 121 maintains the first call s1 to be performed normally, and performs s5 to receive the called service request s2. The radio source set-up controlling circuitry 122 interacts with the network 2 based on the radio connection (which is used for the service channel set-up controlling circuitry 121 and the radio source set-up controlling circuitry 122 to set up the data channel to interact with the network 2 for data transmission), so as to revise and reconfigure radio resources and prepare radio resources s6 for the second service channel via the second port. After the radio source set-up controlling circuitry 122 succeeds in preparing radio resources s7 for the call of the second service channel, a channel s8 of the second call is set up between the terminal 1 and the network 2 successfully. A sender of the called service request s2 may use the second service channel to make the second call s9 with the terminal 1. The terminal 1 records content of the second call s9, and content of the recording is stored in a storing circuitry 123, while the first call s1 is still in a normal calling state.

In some embodiments, when the subscriber identity card 11 is using the second service channel to make a first call s1, the terminal 1 receives a called service request s2 to the subscriber. The call controlling circuitry 12 may directly set up the first service channel for making a call to respond to the called service request s2 and starts recording s9, according to an instruction preset by the subscriber. In this way, a waiting time period of the sender of the called service request s2 may be shortened, and the first call s1 of the subscriber is prevented from being interfered.

In some embodiments, when receiving the call service request s2, the terminal 1 may not have used the second service channel to make a call. If s4 indicates that the subscriber doesn't want to listen to the incoming call currently and the terminal 1 is instructed to record the incoming call directly, the terminal 1 may directly set up the first service channel to make a call and record it.

In some embodiments, the storing circuitry 123 may be pre-stored in the terminal 1 in hardware or software, or stored in a cloud or other external storing devices and perform data interaction with the terminal 1.

In some embodiments, the call controlling circuitry 12 may include a voice playing sub-circuitry (not shown in FIG. 4) configured to: following the call controlling circuitry 12 setting up the first service channel to respond to the called service request s2 and prior to the storing circuitry 123 starting the recording s9, play a predetermined voice based on the first service channel.

It should be noted that, although the above embodiments are described by taking a single subscriber in a mobile terminal as an example, embodiments of the present disclosure is not limited thereto. That is, embodiments of the present disclosure are also adapted to a terminal of multi-subscribers, such as a terminal supporting multiple subscriber identity cards, as long as at least one subscriber of the multi-subscribers is capable of setting up multiple service channels.

Although the present disclosure has been disclosed above with reference to embodiments thereof, it should be understood that the disclosure is presented by way of example only, and not limitation. Those skilled in the art can modify and vary the embodiments without departing from the spirit and scope of the present disclosure.

What is claimed is:

1. An incoming call recording method for a multi-channel terminal, comprising:
   receiving a service request associated with a current subscriber identity card, wherein the service request comprises a called service request to a current subscriber which is identified by the current subscriber identity card; and
   in response to the service request, setting up a first service channel for making a call and starting recording based on an instruction of the current subscriber, wherein the first service channel is set up based on the current subscriber identity card,
   wherein prior to receiving the service request associated with the current subscriber identity card, the current subscriber identity card is in a call using a second service channel which is set up based on the current subscriber identity card, and when the first service channel is set up for making a call, the second service channel retains an activated state.

2. The method according to claim 1, wherein the first and second service channels are set up based on a same service access way.

3. The method according to claim 1, wherein content of the recording is service data in the first service channel.

4. The method according to claim 1, further comprising:
   when receiving an instruction of terminating the recording, terminating the recording and releasing the first service channel.

5. The method according to claim 4, wherein the instruction of terminating the recording is given by the current subscriber, or received from a sender which sends the service request via the first service channel.

6. The method according to claim 1, wherein the instruction of the current subscriber comprises:
   a real-time instruction obtained by interaction with the current subscriber after receiving the service request, or an instruction predetermined by the current subscriber before receiving the service request.

7. The method according to claim 1, wherein when starting the recording, or during the recording, or when terminating the recording, an indication is given to the current subscriber.

8. The method according to claim 1, wherein the service request comprises a service request based on an IP Multimedia Subsystem (IMS) network, and service requested by the service request comprises service based on the IMS network.

9. The method according to claim 1, wherein the first and second service channels perform service data transmission based on a data channel which is set up based on a radio network.

10. An incoming call recording device for a multi-channel terminal, comprising:
    a receiving circuitry configured to receive a service request associated with a current subscriber identity card, wherein the service request comprises a called service request to a current subscriber which is identified by the current subscriber identity card;
    a recording circuitry configured to: in response to the service request, set up a first service channel for making a call and start recording based on an instruction of the current subscriber, wherein the first service channel is set up based on the current subscriber identity card; and
    an implementing circuitry configured for the current subscriber identity card to make a call using a second service channel which is set up based on the current subscriber identity card, before the service request associated with the current subscriber identity card is received,
    wherein when the recording circuitry sets up the first service channel for making a call, the second service channel retains an activated state.

11. The device according to claim 10, wherein the first and second service channels are set up based on a same service access way.

12. The device according to claim 10, wherein content of the recording is service data in the first service channel.

13. The device according to claim 10, further comprising:
    a terminating circuitry configured to: when receiving an instruction of terminating the recording, terminate the recording and release the first service channel.

14. The device according to claim 13, wherein the instruction of terminating the recording is given by the current subscriber, or received from a sender which sends the service request via the first service channel.

15. The device according to claim 10, wherein the instruction of the current subscriber comprises:
    a real-time instruction obtained by interaction with the current subscriber after receiving the service request, or an instruction predetermined by the current subscriber before receiving the service request.

16. The device according to claim 10, further comprising an indicating circuitry configured to: when starting the recording, or during the recording, or when terminating the recording, give an indication to the current subscriber.

17. The device according to claim 10, wherein the service request comprises a service request based on an IP Multimedia Subsystem (IMS) network, and service requested by the service request comprises service based on the IMS network.

18. The device according to claim 10, wherein the first and second service channels perform service data transmission based on a data channel which is set up based on a radio network.

* * * * *